Patented July 4, 1950

2,514,220

UNITED STATES PATENT OFFICE 2,514,220

STABILIZERS

Harry E. Albert, Akron, Ohio, assignor to The Firestone Tire & Rubber Company, Akron, Ohio, a corporation of Ohio No Drawing. Application October 17, 1947, Serial No. 780,582

21 Claims. (Cl. 260—29.7)

This invention relates to the stabilization of rubber-like copolymers of the Buna N type; that is, the type generally represented by the rubber-like copolymers of butadiene and acrylonitrile. More generally, it relates to the stabilization of rubber-like copolymers of a conjugated diene—for example, butadiene, isoprene, 2-cyanobutadiene, cyclopentadiene, piperylene, dimethylbutadiene, 2-methyl-1,3-pentadiene, etc.—and a monomer of the general formula $CH_2=C(R)-X$ when R is hydrogen, methyl, ethyl, propyl or chlorine and X is $-CN$, $-CONH_2$, $-COR'$ or $-COOR'$ and $R'$ is an alkyl group which may contain up to about five carbon atoms. The invention includes the process of stabilization as well as the stabilized copolymer, both cured and uncured.

The stabilizer of this invention is an alkylated naphthol. It includes for example:

tert-octyl-beta-naphthol
tert-butyl-beta-naphthol
di-tert-butyl-beta-naphthol
di-tert-butyl-alpha-naphthol
di-tert-amyl-alpha-naphthol
amyl-beta-naphthol
heptyl-beta-naphthol
diamyl-beta-naphthol
dodecyl-beta-naphthol
octadecyl-beta-naphthol
methyl-beta-naphthol
dimethyl-beta-naphthol
tert-octyl, methyl-beta-naphthol
cetyl-beta-naphthol
tetraethyl-beta-naphthol
di-tert-butyl, methyl-beta-naphthol
di-tert-octyl-alpha-naphthol
dimethyl-alpha-naphthol
cyclohexyl-beta-naphthol
tetraethyl-alpha-naphthol
oleyl-beta-naphthol The stabilizers most generally used in Buna N type copolymers at the present time discolor the copolymer itself and light-colored vulcanizates prepared from the copolymer, particularly when exposed to ultraviolet light. The stabilizers of this invention, however, may be used with little or no discoloration. The alkylated beta-naphthols are preferred to the alkylated alpha-naphthols; and, in particular, the alkylated beta-naphthols which contain a tertiary-alkyl group are recommended. The substitution of the one or more alkyl substituents in the naphthol nucleus, apparently, affects the stabilizer so as to retard or stop discoloration. In general, an alkylated naphthol containing a single substituent is more satisfactory than one which contains more substituents. However, the invention includes the use of polyalkylated naphthols as well as the mono- and dialkylated naphthols, which are generally preferred. The alkyl substituent or substituents may contain 1 up to 20 or more carbon atoms.

The following examples illustrate the preparation of the alkylated naphthols:

EXAMPLE 1

*Tert-octyl-beta-naphthol*

Diisobutylene is caused to react with beta-naphthol in equimolecular proportions in the presence of 94 per cent sulfuric acid. (The reaction is described in Hester U. S. 2,008,017.) Purification is effected by extraction with alkali followed by distillation and recrystallization from gasoline or from recrystallization alone. Tert-octyl-beta-naphthol was obtained as a white crystalline material, the melting point being about 126–127.5° C., uncorrected.

EXAMPLE 2

*Tert-butyl-beta-naphthol*

Equimolecular proportions of tert-butyl chloride and beta-naphthol were reacted in the presence of zinc chloride at 45–50° C. for 18 hours. Dry gasoline was used as the solvent. The product was purified by alkali extraction and recrystallization from gasoline. Tert-butyl-beta-naphthol was thus obtained as a white crystalline material with a melting point of 117–118° C., uncorrected.

EXAMPLE 3

*Di-tert-butyl-beta-naphthol*

Two mols of tert-butyl chloride and 1 mol of beta-naphthol were reacted in the presence of zinc chloride until the evolution of hydrogen chloride virtually stopped. Then aluminum chloride was added to complete the reaction. The product was purified by water extraction, alkali extraction, and recrystallization from gasoline. Di-tert-butyl-beta-naphthol was obtained as white crystals melting at 132.5–133° C., uncorrected.

The following tests are recorded to show the stabilizing effect of the alkylated naphthols and also to show that they discolor the copolymers only slightly. In each of the examples 2 parts of stabilizer was added to 100 parts of the uncured copolymer while in the form of latex resulting from emulsion copolymerization of the butadiene and acrylonitrile. Thus, the stabilizer is made effective during drying of the coagulum as well as in subsequent vulcanization and ultimate use and storage. The tests recorded were conducted on a commercial copolymer which might be distinguished as one of high acrylonitrile content to which modifier had been added to make it processible.

The first test compares uncured copolymer containing no antioxidant with uncured copolymer containing the antioxidants of Examples 1 and 2. In each case, the color after drying is noted and also the condition of each sample as observed by a hand test. A blank (no antioxidant) is included in the test for comparison. The tests on heat-aging include results of the same hand test on the material to determine the effect of the aging and also the results of what is known as a mill break-down test. This latter is a measure of the degree of set-up of the aged copolymer as determined by folding it twice, passing it through the mill once with the rolls separated 0.05 inch, and then milling it until a smooth band is obtained. The figures given refer to the time in seconds (exclusive of the initial pass) required to produce a smooth band.

TABLE I

Copolymer stabilization

| Antioxidant | After Drying | | After Heat-aging 4 Days at 100° C. | |
|---|---|---|---|---|
| | Color | Hand Test | Hand Test | Mill Breakdown |
| tert-octyl-beta-napthol | brown | no deterioration | good condition | 61 |
| tert-butyl-beta-naphthol | do | do | do | 68 |
| blank (no antioxidant) | dirty brown | somewhat set up | very poor condition | 210 |

Tables II and III refer to tests conducted on cured copolymer to which 2 parts per 100 of different stabilizers were added in latex form before curing, the material being compounded according to the following formula:

Formula 1

| | |
|---|---|
| Copolymer containing 2 parts stabilizer | 100.00 |
| Sulfur | 2.00 |
| Zinc oxide | 5.00 |
| Channel black | 40.00 |
| Accelerator | 1.30 |

Cures were conducted for 60 and 80 minutes at 280° F., and the averages of the values obtained on samples thus cured are recorded in the tables. In Table II the properties of a vulcanizate containing one of the stabilizers of this invention is compared with vulcanizate containing phenyl-beta-naphthylamine, one of the most widely used stabilizers for this type of rubber-like copolymer. In Table III the properties of vulcanizates containing different stabilizers are recorded and compared with the properties of a blank which contains no antioxidant.

TABLE II

Properties of vulcanizate

| | Tert-butyl-beta-naphthol | Phenyl-beta-naphthylamine |
|---|---|---|
| 300% Modulus: | | |
| Normal | 1,225 | 1,200 |
| Aged | 2,750 | 2,875 |
| Per Cent of Normal | 225 | 239 |
| Tensile: | | |
| Normal | 3,925 | 4,050 |
| Aged | 4,150 | 4,175 |
| Per Cent of Normal | 105.8 | 103.0 |
| Elongation: | | |
| Normal | 615 | 620 |
| Aged | 405 | 400 |
| Per Cent of Normal | 65.8 | 64.5 |

Modulus and tensile strength are recorded herein in pounds per square inch.

The "aged" material referred to in the above table was aged 4 days in an oven at 100° C.

The above data indicate that the properties of Buna N stabilized with tert-butyl-beta-naphthol and phenyl-beta-naphthylamine are relatively equivalent, both before and after aging.

TABLE III

Physical properties of vulcanizate

| Antioxidant | 300% Modulus | Tensile | Elongation |
|---|---|---|---|
| tert-octyl-beta-naphthol | 1,400 | 4,000 | 595 |
| tert-butyl-beta-naphthol | 1,225 | 3,925 | 615 |
| di-tert-butyl-beta-naphthol | 1,375 | 3,925 | 615 |
| blank (no antioxidant) | 2,550 | 3,325 | 340 |

The above data clearly show the advantages of the use of alkylated beta-naphthols over a blank, at least with respect to normal tensile properties.

Other tests were conducted on vulcanizate heavily loaded with white pigment. For these tests the copolymer was compounded according to the following formula, the different stabilizers being added to the emulsion of uncured copolymer before coagulation and drying.

Formula 2

| | |
|---|---|
| Copolymer containing 2 parts stabilizer | 100.00 |
| Cumar MH 2½ | 7.50 |
| Sulfur | 2.25 |
| Magnesium oxide | 5.00 |
| Zinc oxide | 85.00 |
| Fine particle kaolin | 20.00 |
| Rayox | 20.00 |
| Benzothiazyl disulfide | 1.10 |
| Zinc diethyl dithiocarbamate | 0.20 |

Stocks compounded according to this formula were cured for 40 and 60 minutes at 280° F. The values given in Table IV are an average of those thus obtained.

TABLE IV

Properties of vulcanizate

| Antioxidant | 200% Modulus | 300% Modulus | Tensile | Elongation |
|---|---|---|---|---|
| tert-octyl-beta-naphthol | 740 | 1,240 | 2,125 | 385 |
| tert-butyl-beta-naphthol | 525 | 900 | 1,750 | 410 |
| di-tert-butyl-beta-naphthol | 600 | 1,040 | 1,990 | 395 |
| phenyl-beta-naphthylamine | 525 | 890 | 1,675 | 395 |

The above table shows that the alkylated naphthols give normal tensile properties in a white stock comparable to the tensile in a stock similarly compounded with phenyl-beta-naphthylamine.

The discoloration of Buna N type compounds with the stabilizers currently used is most noticeable on exposure to ultraviolet light. The tests recorded in Table V compare the color produced by artificial exposure to light high in ultraviolet rays in stocks compounded according to Formula 2 and containing, respectively, stabilizers of this invention, the most widely used commercial stabilizer, and a blank containing no stabilizer. The stocks tested were cured 40 and 60 minutes at 280° F., and stocks subjected to both cures were exposed in each instance and gave the same result. The Fadeometer test was carried on for 10 hours at 125° F. The sunlamp test was carried out with a General Electric sunlamp by exposure for 16 hours at 7 inches.

TABLE V

*Exposure tests*

| Antioxidant | Fadeometer | Sunlamp |
|---|---|---|
| tert-octyl-beta-naphthol | Nearly white | Off white. |
| tert-butyl-beta-naphthol | do | Do. |
| di-tert-butyl-beta-naphthol | do | Do. |
| phenyl-beta-naphthylamine | Brown | Brown. |
| blank (no antioxidant) | Nearly white | Off white. |

The above exposure tests show that the addition of an alkylated beta-naphthol causes no additional discoloration as compared with vulcanizate which contains no antioxidant. As regards discoloration on exposure to ultraviolet light, the stabilizers of this invention are shown to be superior to phenyl-beta-naphthylamine.

Although in the recorded tests 2 parts of stabilizer per 100 parts of copolymer were used, and the stabilizer was added to the latex, the examples are illustrative only. The stabilizer may be added at any stage and by any suitable means. The amount of stabilizer may vary. For example, about 0.1 to about 10.0 per cent, more or less, may be employed. In general, in white or light-colored stocks in which discoloration is objectionable, a tertiary alkylated naphthol will be used, and especially a tertiary alkylated beta-naphthol. The ratio of the butadiene to the acrylonitrile in the copolymer may vary. The term butadiene is used herein to refer to 1,3-butadiene.

The invention is defined in the appended claims.

What I claim is:

1. Rubber-like copolymer of a conjugated diene and a monomer having the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which copolymer is stabilized by a substituted naphthol containing a substituent of the class consisting of alkyl, cyclohexyl and oleyl.

2. Rubber-like copolymer of butadiene and acrylonitrile stabilized with an alkylated beta-naphthol which contains a tertiary-alkyl substituent.

3. Latex of uncured, rubber-like copolymer of a conjugated diene and a monomer with the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which latex is stabilized with a substituted naphthol containing a substituent of the class consisting of alkyl, cyclohexyl and oleyl.

4. Latex of uncured, rubber-like copolymer of butadiene and acrylonitrile stabilized with an alkylated beta-naphthol which contains a tertiary-alkyl substituent.

5. Coagulum of uncured, rubber-like copolymer of a conjugated diene and a monomer of the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which coagulum is stabilized with a substituted naphthol containing a substituent of the class consisting of alkyl, cyclohexyl and oleyl.

6. Coagulum of uncured, rubber-like copolymer of butadiene and acrylonitrile stabilized with an alkylated beta-naphthol which contains a tertiary-alkyl substituent.

7. Vulcanizate of rubber-like copolymer of a conjugated diene and a monomer having the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which copolymer is stabilized with a substituted naphthol containing a substituent of the class consisting of akyl, cyclohexyl and oleyl.

8. Vulcanizate of rubber-like copolymer of butadiene and acrylonitrile stabilized with a substituted naphthol containing a substituent of the class consisting of alkyl, cyclohexyl and oleyl.

9. Vulcanizate of rubber-like copolmer of butadiene and acrylonitrile stabilized with an alkylated beta-naphthol which contains a tertiary-alkyl substituent.

10. The method of drying coagulum of uncured, rubber-like copolymer of a conjugated diene and a monomer having the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which method comprises heating the copolymer in the presence of a stabilizer which is a substituted naphthol containing a substituent of the class consisting of alkyl, cyclohexyl and oleyl.

11. The method of drying coagulum of uncured, rubber-like copolymer of butadiene and acrylonitrile which comprises heating the same in the presene of a stabilizer which is a substituted naphthol containing a substituent of the class consisting of alkyl, cyclohexyl and oleyl.

12. The method of drying coagulum of rubber-like copolymer of butadiene and acrylonitrile which comprises heating the same in the presence of a stabilizer admixed therewith, which stabilizer is an alkylated beta-naphthol which contains a tertiary-alkyl substituent.

13. The method of vulcanizing rubber-like copolymer of a conjugated diene and a monomer having the formula $CH_2=C(R)-X$ when R is from the group consisting of hydrogen, methyl, ethyl, propyl and chlorine, X is from the group consisting of $-CN$, $-CONH_2$, $-COR'$ and $COOR'$ and R' is an alkyl group which contains one to five carbon atoms, which method comprises curing the copolymer in the presence of a stabilizer which is a substituted naphthol containing a substituent of the class consisting of alkyl, cyclohexyl and oleyl.

14. The method of vulcanizing rubber-like copolymer of butadiene and acrylonitrile which comprises curing the copolymer in the presence of a stabilizer which is a substituted naphthol containing a substituent of the class consisting of alkyl, cyclohexyl and oleyl.

15. The method of vulcanizing rubber-like copolymer of butadiene and acrylonitrile which comprises curing the same with sulfur in the presence of a stabilizer which is an alkylated beta-naphthol which contains a tertiary-alkyl substituent.

16. Uncured rubber-like copolymer of butadiene and acrylonitrile stabilized with tertiary-butyl-beta-naphthol.

17. Uncured rubber-like copolymer of butadiene and acrylonitrile stabilized with tertiary-octyl-beta-naphthol.

18. Uncured rubber-like copolymer of butadiene and acrylonitrile stabilized with ditertiary-butyl-beta-naphthol.

19. Vulcanizate of rubber-like copolymer of butadiene and acrylonitrile stabilized with tertiarybutyl-beta-naphthol.

20. Vulcanizate of rubber-like copolymer of butadiene and acrylonitrile stabilized with tertiaryoctyl-beta-naphthol.

21. Vulcanizate of rubber-like copolymer of butadiene and acrylonitrile stabilized with ditertiarybutyl-beta-naphthol.

HARRY E. ALBERT.

REFERENCES CITED

The following references are of record in the file of this patent:

UNITED STATES PATENTS

| Number    | Name | Date          |
|-----------|------|---------------|
| 2,031,930 | Buc  | Feb. 25, 1936 |

FOREIGN PATENTS

| Number  | Country       | Date          |
|---------|---------------|---------------|
| 355,425 | Great Britain | Aug. 27, 1931 |